United States Patent [19]

Lotito et al.

[11] Patent Number: 4,516,529

[45] Date of Patent: May 14, 1985

[54] AQUARIUM

[76] Inventors: Vincent Lotito, 9 John St., East Rockaway, New York, N.Y. 11518; Stephen R. Fletcher, 137 S. Village Ave., Rockville Center, N.Y. 11570

[21] Appl. No.: 409,528

[22] Filed: Aug. 19, 1982

[51] Int. Cl.³ ............................................. A01K 64/00
[52] U.S. Cl. ..................................................... 119/5
[58] Field of Search ............................................. 119/5

[56] References Cited

U.S. PATENT DOCUMENTS

| | | | |
|---|---|---|---|
| 1,974,068 | 9/1934 | Greensaft | 119/5 |
| 3,232,271 | 2/1966 | DeJose et al. | 119/5 |
| 3,374,771 | 3/1968 | Michie et al. | 119/5 |
| 3,892,199 | 7/1975 | Huyler | 119/5 |
| 4,082,062 | 4/1978 | Rodemeyer | 119/5 |
| 4,117,805 | 10/1978 | Ward | 119/5 |
| 4,196,695 | 4/1980 | Zupo | 119/5 |
| 4,201,153 | 5/1980 | Nace | 119/5 |
| 4,300,478 | 11/1981 | Wise | 119/5 |

*Primary Examiner*—Hugh R. Chamblee
*Attorney, Agent, or Firm*—Murray Schaffer

[57] ABSTRACT

An aquarium for housing fish and other aquatic life if formed within a pyramidal housing. The upper portion of the housing is formed of transparent triangular walls which enclose the water for the fish while permitting viewing of the fish. The lower portion of the housing serves as a base for supporting the water, and includes a drawer which holds filtration, heating and aeration equipment while permitting ready access for servicing of the equipment. Lighting is provided by an internal pyramidal light situated at the apex of the housing within the walls, the location permitting lighting of the entire water surface without any significant heating of the walls. All plumbing connections for treatment of the water are made through the floor of the chamber holding the water, thereby avoiding the presence of unsightly hoses and tubing. By the placing of the filtering equipment below the water chamber, the filtering system is able to self-prime, thereby eliminating the process of siphoning in the caring of the aquarium.

1 Claim, 7 Drawing Figures

AQUARIUM

BACKGROUND OF THE INVENTION

This invention relates to aquariums for the housing of fish and other acquatic life and, more particularly, to an aquarium having a transparent water chamber of pyramidal shape set on top of a base containing all the water processing equipment.

Aquariums are often used in the home, as well as in many offices, for the displaying of fish and aquatic life. The aquariums are generally polygon glass or plastic boxes in which minature aquatic flora, stones and the like are arranged in an attractive manner so as to enhance the beauty of the fish and the aquatic life. Lighting apparatus is generally placed on top of the aquarium to illuminate its contents, while hoses of filtration equipment drape over the sides of the aquarium for cleaning and aeration of the water. For heating the water, a heater is also draped over the sides of the aquarium.

One problem is immediately apparent, namely that the lighting, filtration and heating apparatus which is employed to create an assimilated environment for the aquarium obscures the viewing of the fish and aquatic life therein. Also, the hoses, even though usually draped over a rear wall of the aquarium, still detract from the beauty thereof.

An additional problem becomes apparent upon a changing of the water. A syphoning process must be employed to lift the water over the sides of the aquarium and upon replacing the water, the draping of the hoses precludes a self-priming of the filtration equipment, again necessitating the syphoning process.

A further problem arises in the heating of the water. The heater is frequently set within the water with an electric power cord draped over a side of the aquarium. Such an arrangement detracts from the beauty of the aquarium. Alternatively, a heat lamp may be employed. However, the radiant heat from such a lamp may heat the walls of the container and, with excessive heating, preclude the use of desirable materials such as the plastics in the construction of the aquarium.

A heat lamp does not contain a thermostat, therefore, extended periods of time in use will cause excessive heat endangering all forms of aquatic life.

It is an object of the present invention to provide an improved aquarium of enhanced beauty and function.

It is a further object to provide an aquarium comprising a water-holding chamber and a separable compartment for holding water-processing equipment which equipment performs all the previously mentioned functions but is concealed from view.

SUMMARY OF THE INVENTION

In accordance with the invention, both the chamber and the compartment are formed within a unitary structure having a pyramidal shape. The chamber is formed of a set of triangular walls meeting in a common apex and resting upon the peripheral edges of a polygonal floor. In the preferred embodiment of the invention, four such walls rest on a square floor, with each wall being an isosceles triangle of transparent material such as acrylic plastic. The four sides and the floor are hermetically sealed to make the chamber waterproof. A transparent door, also of the acrylic plastic, seats in an aperture in one of the chamber walls to provide access to fish and marine life, as for feeding, within the chamber. A lamp, supported within the chamber at the apex, illuminates all the water, fish and marine life inside the chamber without significant heating of the plastic walls.

The compartment which houses the water-processing equipment is located within a base of the unitary structure beneath the water-holding chamber. The compartment is formed as a drawer which is slidably mounted within the base so as to provide facile access to the water-processing equipment. The equipment includes a filter for removing waste material from the water, a heater for heating the water to maintain the water at a desired temperature, and an aeration pump for efficient oxygenation.

Connection between the chamber and the water-processing equipment is made by tubing passing from the floor of the chamber to the individual components of the equipment within the drawer. The tubing is flexible to permit opening and closing of the drawer without disconnection of the tubing. The filter, the heater, and a water pump are connected in series by tubing with inlet and outlet water ports protruding through the floor. The ports are diametrically positioned in opposite corners of the floor and are oriented in opposite directions so as to impart a circular motion of water in the chamber. The circular movement is advantageous in the prevention of areas of stagnant water as may occur in the conventional aquarium. The inlet and the outlet ports are conveniently fabricated of angled sections of tubing which pass through aperatures in the floor, and are secured in water-tight engagement with the floor by means of plastic washers. A third port, of similar construction to the foregoing two water ports is provided in the floor for connection of an air line to the aeration nozzle. The aeration nozzle is connected via a tube to the third port, and the air line is also fabricated of tubing which connects from the underside of the third port to the aeration pump.

The use of separate aeration and water pumps provides independent operation of the filtering and aeration functions. A one-way check valve is provided in the air line to prevent backup of water towards the aeration pump in the event that the pump, is shut off for servicing of the aeration system. For changing the filter floss, or other filtering agent, there is sufficient slack in the tubing to permit raising of the filter out of the drawer to a height above the chamber water level so as to prevent the spilling of water from the filter.

It is advantageous to construct the floor of transparent acrylic plastic as is used in the walls of the chamber. An additional lamp may then be deployed in the base for an attractive illumination of the water, colored gravel and fish from below the floor.

The pyramidal structure of the aquarium is readily supported on a stand to permit placement at any convenient location in a room of the home or office with the advantage of being viewed from all four sides. If desired, the stand can be disconnected from the base to allow setting the aquarium directly on a flat surface such as a table.

BRIEF DESCRIPTION OF THE DRAWINGS

The aforementioned features and other aspects of the invention are explained in the following description taken in connection with the accompanying drawings wherein.

DESCRIPTION OF THE PREFERRED EMBODIMENT

Figure 1:
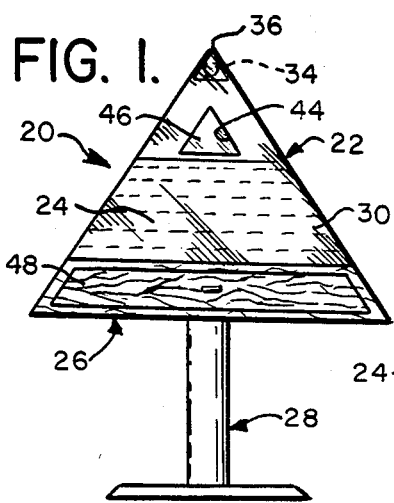
FIGS. 1, 2 and 3 show simplified views of the structure of the aquarium, respectively, front elevation, top plan, and isometric views showing the artistic design made possible by the pyramidal structure.
Figure 2:
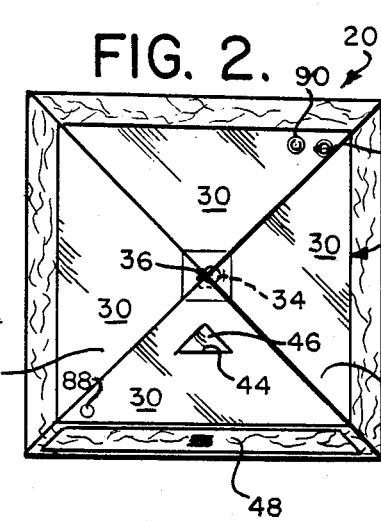
Figure 3:
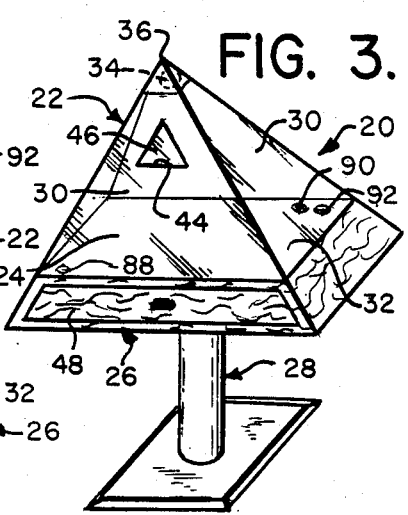

Referring now to the figures, an aquarium 20 is provided within a pyramidal housing generally depicted by the numeral 22. The housing 22 comprises a chamber 24 in its upper portion and a base 26 in its lower portion, the housing being conveniently supported by a stand 28 connecting with the base 26. The stand 28 may be removable, allowing the housing to be placed directly on a table or the like. The chamber 24 rests upon the base 26 and contains water with fish and other aquatic life. The chamber 24 is constructed of four walls 30 standing on the peripheral edges of a square floor 32. The walls 30 and the floor 32 are made of transparent acrylic plastic, and are hermetically sealed together for waterproof construction of the chamber 24. Each of the walls 30 is in the shape of an isosceles triangle, and has the side edges beveled to 35 degrees with the base edge being beveled to 38 degrees to permit the joining of the walls 30 and floor 32 in the shape of a pyramid. It will also be appreciated that the chamber 24 can take other geometric shapes, as for example having more than four sides. Polyhedral forms will be apparent. Of course, the base 26 will also be modified in shape to conform to the particular polyhedral shape. Electrical connections for energizing the lamps 34 and 38 are made via the base 26, the connection for the pyramidal lamp 34 being had by means of wires 40 substantially hidden from view by their locations along the connecting corners of two walls and lying interiorly in the base drawer 26. The corner edges of the pyramidal shaped housing may be provided with edge moldings, to further hide such wire and enhance the beauty of the pyramid, by covering the corners.

One of the walls 30 is provided with an access port 44 closed off by a removable cover 46 which sets flush within the aperture of the port 44 and is made of the same acrylic plastic as the wall 30 to insure complete viewing of the fish. The port 44 provides access to the interior of the chamber 24 for feeding the fish, as well as for the arranging of the contents of the chamber 24.

The base 26 is fabricated of decorative wood and/or plastic and includes a slidably mounted drawer 48 for holding the water treatment equipment generally depicted by the numeral 50.

Figure 6:
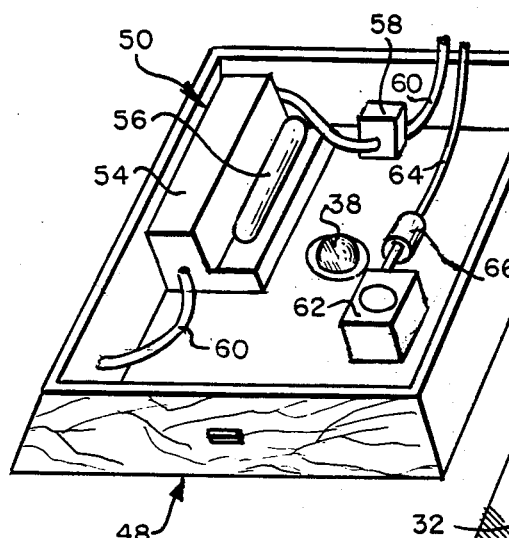
FIG. 6 is a sectional view of the opened drawer showing the Filter-heater, water pump, check valve, all connecting hoses, lower lighting system and an A-C junction box for power source.
Figure 4:
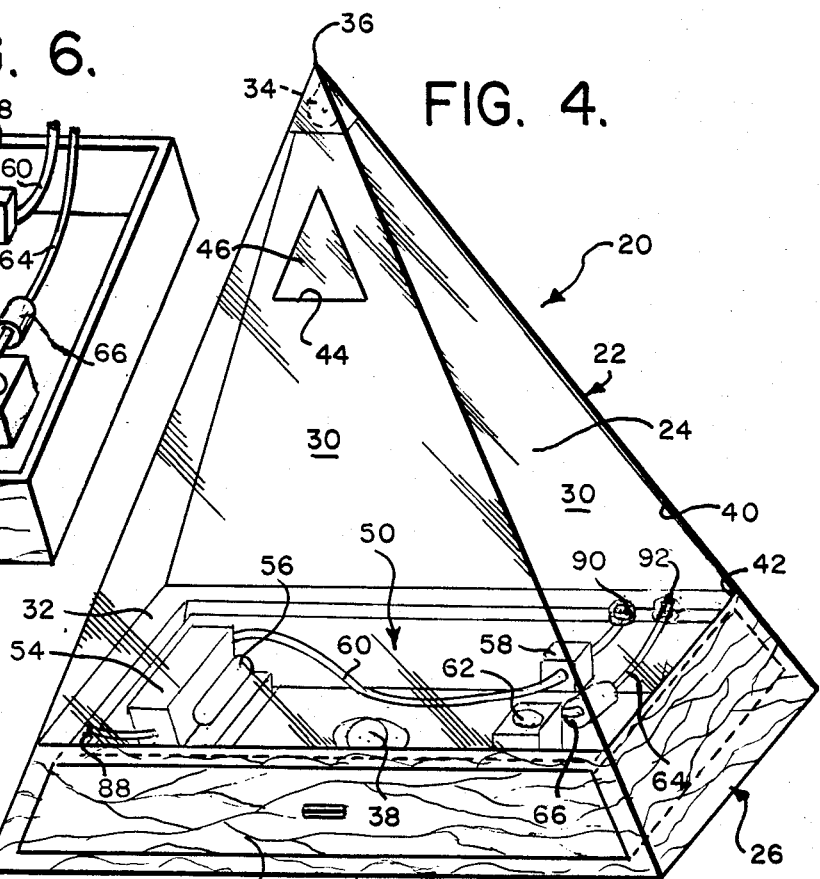
FIG. 4 is an axonometric view, partially diagrammatic to show the processing equipment, of the aquarium.

The equipment contained in the drawer 48, as seen in FIG. 6 comprises a filter 54 for the extraction of debris and waste from the water, a heater 56 for heating the water, and a pump 58 for pumping the water via tubing 60 from the chamber 24 through the filter 54 and via the heater 56 back to chamber 24. An air pump 62 is also located in the drawer to bubble air through conduit 64, via a one way valve 66 and nozzle 68 for aerating the water in the housing 22.

Figure 7:
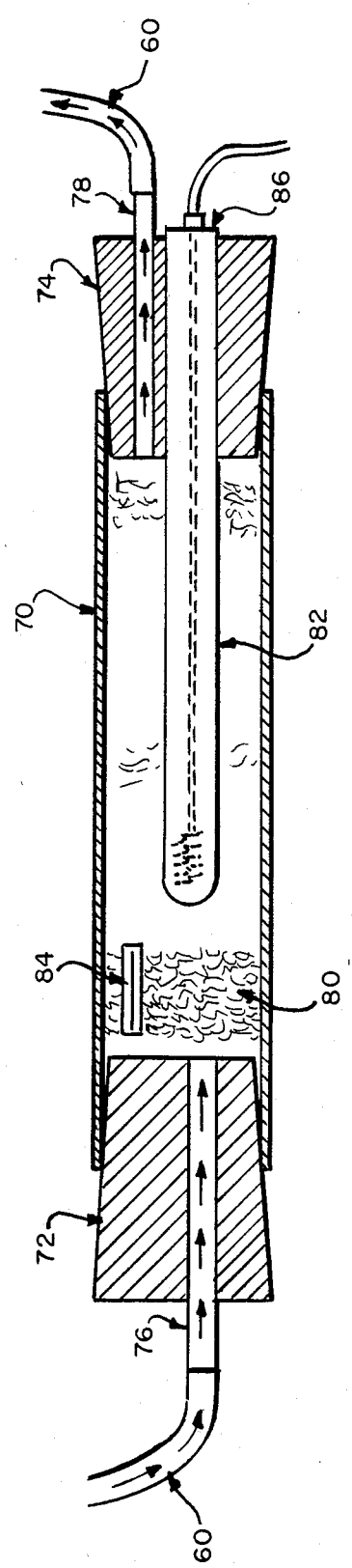
FIG. 7 is a sectional view of a preferred filter/heater container showing the inlet and outlet ports and glass heater tube within the rubber stoppers.

While conventional equipment can be used in the present aquarium, a particularly suitable and advantageous heater/filter unit is shown in FIG. 7. The heater/filter unit is comprised of a cylindrical tube constructed of clear acrylic plastic with two rubber end stoppers 72, 74 placed at both ends to ensure water tight closure. Inlet and outlet filter ports 76 and 78 through the stoppers are sealed with tubes connected to the filter tubing 60 and filter floss 80 is placed within the cylinder 70 to enable purification of the water. A glass enclosed heater element 82 extends through stopper 74, into the mass of filter floss 80, thus heating the filtered water therein prior to its exit. Maintenance is, easily, achieved by disconnecting flexible tubing 60 at both ends and removing the rubber stoppers 57, 59. A thermometer 84 used to monitor aquarium water is also placed in the filter container cylinder 70, thus eliminating another necessary device from view in the aquarium. It is, however, readily viewable through the cylinder 70. The terminals 56 of the heater can be easily connected to the power source.

The tubing 60, the air line 64, and the electric wiring are all flexible and of sufficient length to permit opening and closing of the drawer 48. The electric wires preferably have nontoxic plastic insulation and, similarly, the tubing 60 and the air line 64 are fabricated of nontoxic plastic to permit their use in the heat within the chamber 24.

Figure 5:
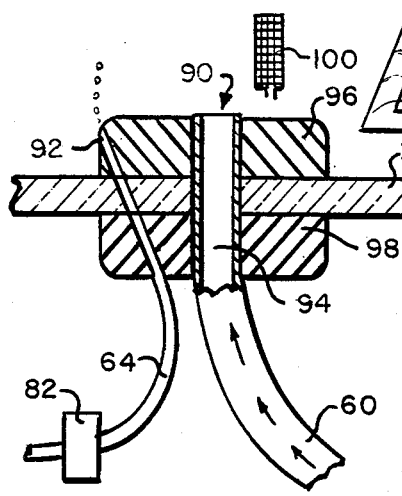
FIG. 5 is a sectional view of the floor of the water chamber showing the securing of the filtration and aeration ports to the floor.

Connection of the tubing 60 to the chamber 24 is made by way of two ports, an inlet port 88 and an outlet port 90, the connection of the air line 64 to the nozzle 68 being made by the way of a third port 92, as seen in expanded view, in FIG. 5. The filter inlet and outlet ports 88 and 90 are formed of acrylic tube sections with their respective orifices being directed perpendicular to the floor 32, and are located in opposite corners of the chamber 24 to induce circular motion to the water. The circular motion eliminates the presence of any stagnant water.

Each of the ports 88, 90 and 92 is formed by an aperture in the floor 32. A tube section 94 passes through the aperture and is hermetically sealed to the floor 32 by two washers 96 and 98 pressed between the edges of the aperture and the outer surface of the tube section 94. A removable filter screen 100 is positioned on the inlet port to prevent suctioning of the fish and other aquatic matter into the tubing 60. In the even that elements of the water treatment equipment are to be removed for servicing, plugs (not shown) are to be inserted into the orifices of the ports 88, 90 and 92 to prevent spilling of water. The one-way check valve 66 prevents the back-up of water into the air pump 62 in the event that power is shut off to the pump.

It is to be understood that the above described embodiment of the invention is illustrative only, and that modifications thereof may occur to those skilled in the art. Accordingly, this invention is not to be limited to the embodiment described herein, but is to be limited only as defined by the appended claims.

What is claimed is:

1. An aquarium comprising:
   a set of triangular transparent walls;
   a polygonal floor, said walls standing on the peripheral edges of said floor and being sealed therewith to form a chamber in the form of a pyramid;

water entry and exit ports disposed in said floor on opposite sides of said pyramid and having their orifices located in opposite corners of said polygonal floor and directed through said water perpendicularly to said floor upwardly along the walls of said chamber to induce a circular movement to water in said chamber;

a base mounted to and positioned beneath said chamber for supporting said chamber, a drawer slidably and removably mounted in said base; water treatment equipment located in said drawer and including flexible tubing for connection with said ports; said equipment including a filter for filtering waste material in said water, a heater for heating said water, and a pump for pumping said water via said entry and exit ports and through said filter and past said heater;

a lamp within said chamber for illuminating water within said chamber;

a light beneath said floor for illuminating the water in said chamber, said floor being transparent for propagating illuminating rays of said light into said chamber; and an air pump in said drawer, and an aeration nozzle in said chamber; said air pump and said nozzle being connected by flexible tubing for driving air into said chamber; and a check valve connected between said air pump and said nozzle for preventing back-up of water in said air pump.

* * * * *